United States Patent
Comiskey et al.

(10) Patent No.: US 7,321,870 B1
(45) Date of Patent: Jan. 22, 2008

(54) SYSTEM AND METHOD FOR PROVIDING FINANCIAL SERVICES TO HIGH NET WORTH INDIVIDUALS

(75) Inventors: Stephen W. Comiskey, 3387 Stephenson Pl., NW, Washington, DC (US) 20015-2451; Timothy H. Meyers, Herndon, VA (US)

(73) Assignee: Stephen W. Comiskey, Washington, DC (US)

( * ) Notice: Subject to any disclaimer, the term of this patent is extended or adjusted under 35 U.S.C. 154(b) by 1044 days.

(21) Appl. No.: 09/520,763

(22) Filed: Mar. 8, 2000

(51) Int. Cl.
*G06Q 40/00* (2006.01)

(52) U.S. Cl. .................... 705/36 R; 705/35; 705/36 T

(58) Field of Classification Search ............ 705/35, 705/40, 26, 36, 2, 3, 41, 80, 400, 1, 7; 709/224, 709/201, 217, 219; 455/406; 707/10, 3
See application file for complete search history.

(56) References Cited

U.S. PATENT DOCUMENTS

| | | | |
|---|---|---|---|
| 4,346,442 A * | 8/1982 | Musmanno ................ 364/408 |
| 4,694,397 A * | 9/1987 | Grant et al. ................ 364/408 |
| 5,231,571 A | 7/1993 | D'Agostino ................ 364/408 |
| 5,383,113 A | 1/1995 | Kight et al. ................ 364/401 |
| 5,774,663 A | 6/1998 | Randle et al. .......... 395/200.34 |
| 5,835,087 A * | 11/1998 | Herz et al. .................. 345/810 |
| 5,890,140 A | 3/1999 | Clark et al. .................... 705/35 |
| 5,911,136 A | 6/1999 | Atkins |
| 5,918,207 A * | 6/1999 | McGovern et al. ............. 705/1 |
| 5,918,217 A | 6/1999 | Maggioncalda et al. ...... 705/36 |
| 5,933,816 A | 8/1999 | Zeanah et al. ................ 705/35 |
| 5,940,811 A | 8/1999 | Norris ........................... 705/38 |
| 6,021,397 A | 2/2000 | Jones et al. .................... 705/36 |
| 6,052,673 A * | 4/2000 | Leon et al. .................... 705/38 |
| 6,064,986 A * | 5/2000 | Edelman ........................ 705/36 |
| 6,115,691 A * | 9/2000 | Ulwick ........................... 705/7 |
| 6,119,101 A | 9/2000 | Peckover |
| 6,161,098 A * | 12/2000 | Wallman ....................... 705/36 |
| 6,324,523 B1 * | 11/2001 | Killeen, Jr. et al. ........... 705/35 |
| 6,338,047 B1 * | 1/2002 | Wallman ....................... 705/36 |
| 6,349,290 B1 * | 2/2002 | Horowitz et al. ............. 705/36 |
| 6,360,210 B1 * | 3/2002 | Wallman ....................... 705/36 |
| 6,393,412 B1 * | 5/2002 | Deep ........................... 705/400 |
| 6,405,179 B1 * | 6/2002 | Rebane ......................... 705/36 |
| 6,430,542 B1 * | 8/2002 | Moran ........................... 705/36 |

FOREIGN PATENT DOCUMENTS

WO    WO 01/90997 A2 * 11/2001

OTHER PUBLICATIONS

Warkenthien, Kristina. Mellon Creates Ultra Family Office Division, Private Asset Management, New York, Mar. 6, 2000.*
PNC Advisors to use First Rate Performance to Track After-Tax and Net-of-Fees Performance, Business Wire, New York, Mar. 6, 2000.*

(Continued)

*Primary Examiner*—Alexander Kalinowski
*Assistant Examiner*—Debra F Charles
(74) *Attorney, Agent, or Firm*—Hunton & Williams, LLP

(57) ABSTRACT

A system and method for providing financial and other services to high net worth individuals is described. A significant feature is the method for selecting and managing a comprehensive set of service providers for optimal efficiency and effectiveness. The associated system provides a depository for client data, and enhances communication between client, client data, and service providers.

18 Claims, 5 Drawing Sheets

| | | Frequent Need? 100 | |
|---|---|---|---|
| | | YES | NO |
| High Value? 110 | YES | Core 120 | Affiliated 130 |
| | NO | Affiliated 130 | Non-Affiliated 140 |

OTHER PUBLICATIONS

Deutsche Asset Management Announces Joint Development Project with Professor Andrew Lo and AlphaSimplex Group, LLC PR Newswire, New York, Mar. 6, 2000.*
Canniffe, Mary, Banks roll out red carpet for wealthy private clients, Irish Times, Dublin, Mar. 3, 2000.*
Weitzman, Jennifer, Citi Private Bank to Customize Service on Web, American Banker, New York, NY, Mar. 2, 2000.*
Baker, Gill, Japan Sony's got yen for Web banking, Bank Technology News, New York, NY, Mar. 2000.*
Burke, Jeanne, Cashing in on Wealth Management, Bank Investment Marketing, Feb. 2000, vol. 8, Issue 2, p. 26.*
Merrill Lynch webpage copyright year 1999 and year 2000.*
Schwab webpage, copyright year 2000.*
The VIP FORUM, Family Services, Feb. 2000, Corporate Executive Board.*
Bruce Upbin, Forbes, "Old money chasing new", Jun. 15, 1998.*
Katla Sycara and Dajun Zeng, Coordination of Multiple Intelligent Software Agents, International Journal of Cooperative Information Systems, pp. 1-31, no date.*
Russ Prince & Karen File, All in the Family Office: The Vast Majority of Family Offices Hire Outside Investment Advisers and th Market is Growing, Financial Planning, Oct. 1, 1998.*
Synovus Spoils Wealthy Clients with Family Office Service, Bank Investment Consultant, Sep. 1999, vol. 7, iss. 9, p. 18.*
Kristina Warkenthien, Mellon Creates Ultra Family Office Division, Private Asset Management, Mar. 6, 2000.*
Trust Company Puts Families Online, Private Asset Management, Oct. 18, 1999.*
Rockefeller & Co. web page: www.rockco.com.*
Bessemer Trust Company web page: www.bessemer.com.*
Jennifer Weitzman, Citi Private Bank to Customize Service on Web, American Banker, Mar. 2, 2000.*
U.S. Trust News (visited Jun. 12, 2000) <http://www.ustrust.com/news050100.htm>.
Citi Welcome (visited Jun. 12, 2000) <http://www.citibank.com/domain/navhome.htm>.
Global Corporates and Institutions (visited Jun. 12, 2000) <http://www.db.com/central/ver40/index.html>.
S1 Empowering financial institutions to improve their customers' world (visited Jun. 12, 2000) <http://www.s1.com>.
How do you get there? (visited Jun. 12, 2000) <http://morganonline.com/home.html>.
Spotlight (visited Jun.12, 2000) <http://www.ml.com>.
YourWITAN.com (visited Jun.12, 2000) <http://www.yourwitan.com/home.html>.
VIP Private Capital (visited Jun. 12, 2000) <http://www.vipprivatecapital.com/home.html>.
Overview (visited Jun. 12, 2000) <http://www.bessemer.com/WebSite/Content/Wealth.../WealthManagement.asp6/12/00 &Graphic=WealthManagement>.
Financial Navigator International (visited Jun. 12, 2000) <http://www.finnav.com>.
Financeware.com (visited Jun. 12, 2000) <http://fplanauditors.com/default.asp>.
The Burgiss Group (visited Jun. 12, 2000) <http://www.burgiss.com>.
FMC Financial Models (visited Jun. 12, 2000) <http://www.fmco.com/fmc/noframes/index.htm>.
Solutions for (visited Jun. 12, 2000)<http://www.bankofny.com>.
Market Snapshot: Stocks look to data for direction (visited Jun. 12, 2000) <http://www.quicken.com>.
UBS (visited Jun. 12, 2000) <http://www.ubs.com/e/private_clients.html>.
Sanwa Internet Banking 2000 (visited Jun. 12, 2000) <http://www.sanwabank.co.J. P. Sumner, Esq./contents.html>.
Financial Service Department (visited Jun. 12, 2000) <http://www.rsco.com/financial_services/priv_client_svcs.htm>.
Private Banking Services (visited Jun.12, 2000) <http://www.fleet.com/bkpppb.html>.
PNC Advisors (visited Jun. 12, 2000) <http://www.pncadvisors.com/index.cfm>.
Northern Trust (visited Jun. 12, 2000) <http://www.northerntrust.com/personal_services/index.html>.
Mellon Private Banking (visited Jun. 12, 2000) <http://www.mellon.com/personal/private>.
Julius Baer—The Fine Art of Private Banking (visited Jun.12, 2000) <http://www.juliusbaer.com/priv_bank/r2.html>.
PCT-International Search Report, International Application No. PCT/US01/07035, Mar. 6, 2001.
myCFO.com (visited Mar. 6, 2000) <http://www.mycfo.com>.
Goldman Sachs Asset Management (visited Mar. 6, 2000) <http://www.goldman.co.jp/funds/ABOUT/aboutgsam.html>.
Standard & Poor's Personal Wealth Services (visited Mar. 3, 2000) <http:// www.personal wealth.com>.
Wilson HTM (visited Mar. 3, 2000) <http://www.wilsonhtm.com.au/services/professional_invenstment.cfm>.
Batchelor, Frechette, McCrory, Michael & Co (visited Mar. 3, 2000) <http://www.bfmmcpa.com/pwg.html>.
Quest Financial Services (visited Mar. 3, 2000) <http://www.questfs.co.uk/quest.htm>.
PriVest Bank (visited Mar. 3, 2000) <http://www.privest.com/persserv.htm>.
Ford Financial Associated (visited Mar. 3, 2000) <http://www.fordfinancialassoc.com/about.htm>.
Kedre D. Mellor, CPA/PFS (visited Mar. 3, 2000) <http://www.dwp.bigplanet.com/kmellocrcpapfs/pages/view/vpmaview.nhtml?key=Services>.
Fleet Private Clients Group (visited Mar. 3, 2000) <http://www.fleet.com/afcpis.html>.
Middlefield Private Client Services (visited Mar. 3, 2000) <http://www.middlefield.com/pcs.htm>.
JP Morgan Online (visited Mar. 23, 2000) <http://www.jpmorgan.com/corpinfo/ Press Releases/2000/03132000-Morgan Online.htm>.
Quicken (visited Mar. 23, 2000) <http://www.quicken.com>.

* cited by examiner

|  |  | Frequent Need? 100 ||
|---|---|---|---|
|  |  | YES | NO |
| High Value? 110 | YES | Core 120 | Affiliated 130 |
|  | NO | Affiliated 130 | Non-Affiliated 140 |

FIG. 1

SYSTEM AND METHOD FOR PROVIDING FINANCIAL SERVICES TO HIGH NET WORTH INDIVIDUALS

FIELD OF THE INVENTION

The invention relates generally to a system and method for managing financial assets. The system and method are specifically tailored to meet the financial needs of high net worth individuals, but are also applicable to services outside the realm of finance.

BACKGROUND OF THE INVENTION

High-net-worth individuals typically have diverse financial portfolios. Their holdings may include, for example, cash in banks, money market accounts, publicly-traded stocks, bonds, capital assets, real estate, or equity ownership in public or private businesses. Furthermore, these holdings and interests may be distributed around the world.

It is generally recognized that optimum decision-making relating to the management of such portfolios requires specialized expertise, for example in areas of law, tax, accounting, estate planning, securities brokering, and insurance. Additionally, to be most effective, each decision should be made with a view to the entire portfolio in order to minimize the overall tax liability, for example, or to maintain a minimal degree of total investment risk.

High net worth individuals typically have little time to personally manage their portfolios. Some have significant responsibilities associated with their businesses or professions. Others simply choose to engage in other activities. As a practical matter, any one individual is also very unlikely to possess the total range of specialized expertise to effectively manage a large and complex portfolio without consulting several trusted advisors.

Some financial service entities have developed methods to assist high net worth individuals. Such entities may provide and coordinate advice in the areas of investment selection and management, tax planning, estate planning, or insurance (risk management), for example.

Methods employed by known financial service providers have several drawbacks. First, they fail to comprehend the many needs of the high-net-worth individual, such as specialized legal advice and investment banking services. Even among entities that may claim to provide "full service" support to high net worth individuals, only a limited number of services are actually provided. As a consequence, many services may be performed in a way that is not coordinated with the client's overall portfolio.

Additionally, existing financial services may rely on a single account manager to coordinate the services to a client. An account manager is a limited resource. While this may be acceptable for a client with limited needs, it may be inadequate in the case of a very large and complex portfolio. Another drawback is that it is virtually impossible for a single account manager to have the breadth and depth of experience necessary to effectively balance competing considerations in the management of such portfolios.

These and other drawbacks limit the utility of current methods for providing financial and other services to high net worth individuals.

SUMMARY OF THE INVENTION

Accordingly, it is one object of the invention to provide an improved method for supplying financial and other services to high net worth individuals, trusts, estates, families, or other entities.

It is another object of the invention to provide an applicable set of services to high net worth individuals that are more comprehensive than those currently offered.

It is another object of the invention to make the comprehensive set of services available in an way that is efficient for the business enterprise providing the services.

It is another object of the invention to make the comprehensive set of services available in a way that is efficient and effective for the high net worth individual.

The invention providing these and other benefits and advantages relates to a system and method for deploying a coordinated suite of services, the range of which may be extremely broad, including, for example, both financial and personal services. Advantageously, the services may be provided through a graduated series of service-provider groupings, categorized according to frequency of need and value provided, or other bases. Finally, the needs of a high net worth individual may be coordinated not by a single account manager, but rather, by an experienced group of advisors with the appropriate breadth and depth of experience necessary to manage a large and complex portfolio.

The graduated, or hierarchical, series of service provider groupings are a significant component of the invention. In a preferred embodiment, there may be at least three such groups: core service providers, an affiliated network of service providers, and non-affiliated service providers. Services most common to clients, and those providing the most value to high-net-worth individuals may be included in the core service provider group. Conversely, services least common between clients, and those providing the smallest marginal value to clients may be included in the non-affiliated service provider group. The affiliated service provider group is for services that fall between the other two groupings. Such a method is efficient, because it affords the highest degree of control over the most valuable services and resources. At the same time, it provides no restriction on the type of services that can be offered.

The following drawings and descriptions further describe the invention, including one embodiment of the financial services organization, representative process flows, and a system architecture. Techniques to implement such a method, and the advantages achieved in utilizing such a process, will be clear to a person skilled in the art of financial services.

BRIEF DESCRIPTION OF THE DRAWINGS

FIG. 1 is a table illustrating one method for assigning services to each of three service provider groups.

DETAILED DESCRIPTION OF THE PREFERRED EMBODIMENT

Figure 2:
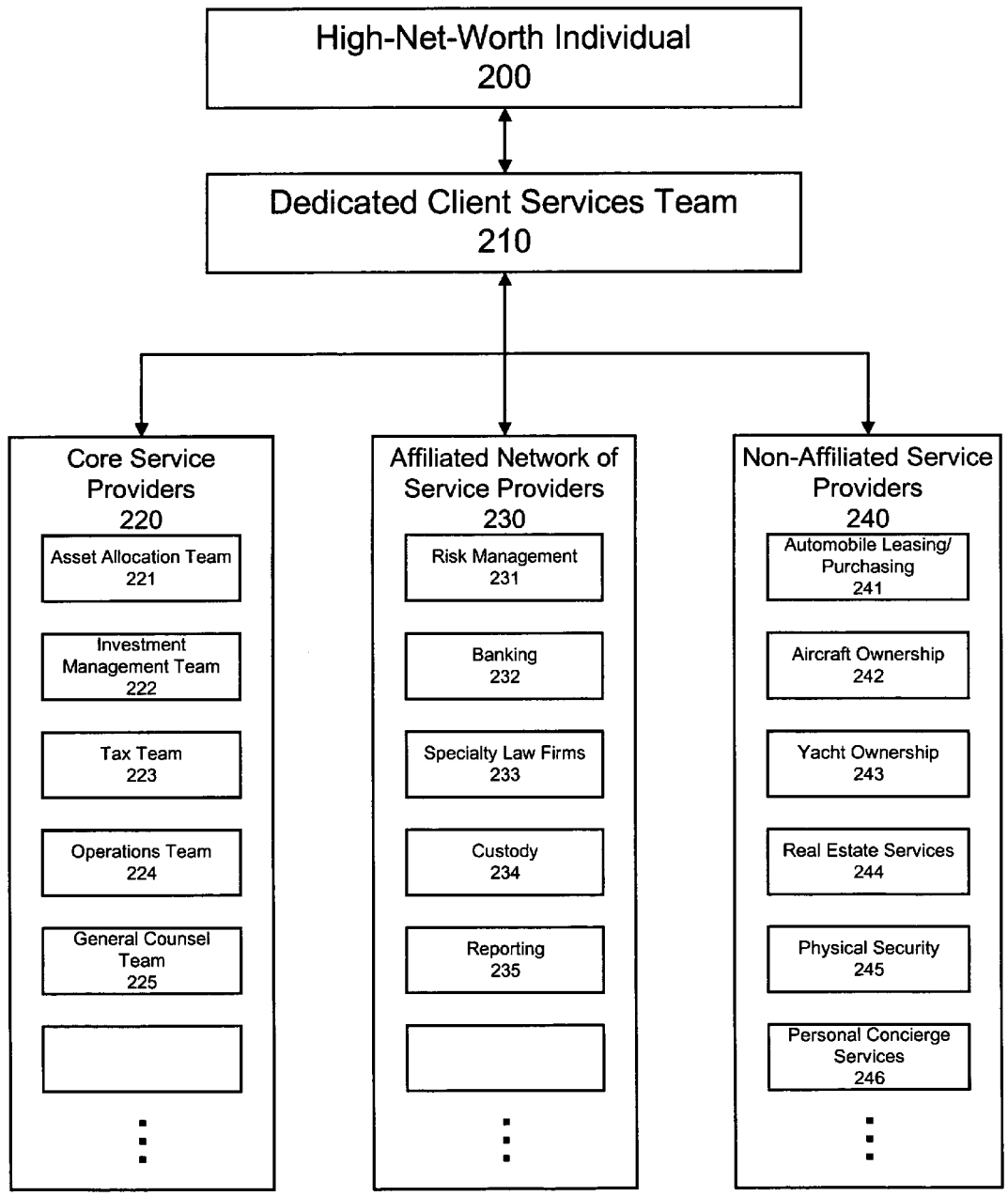
FIG. 2 is a schematic diagram of a financial services organization, according to one embodiment of the invention.

The invention relates a system and method for providing financial and other services to high net worth individuals, in which a series of service categories are arranged for deployment according to a selectable set of criteria. FIG. 1 is a table illustrating one method for assigning services to each of three service provider groups. As illustrated, the assignment may be accomplished by making two inquiries: whether the services are frequently needed by the client 100; and whether there is high value to the client in having such services performed 110. If the answer to both inquiries is yes, then the service should be assigned to the core service group 120. If the answer to both inquires is no, then the service should be assigned to the non-affiliated group 140. Otherwise, the service should be assigned to the affiliated group 130. Of course, providers must be identified for each of these services. The management of those providers is described below.

FIG. 2 is schematic diagram of the financial services organization, deployed according to one embodiment of the invention. A high net worth individual 200 may access financial services through a dedicated client services team 210. The client services team 210, in turn, may have resources available in each of at least three different categories. The first of these may be the core service providers 220, which may be further comprised of experts organized into multiple teams. For example, an asset allocation team 221 may be chartered with the development of an investment plan based on the client's long-term objectives, short-term goals, desired level of risk, and other factors. An investment management team 222 may manage venture capital and equity funds under the control of the core service providers 220. A tax team 223 may coordinate with the asset allocation team 221 in order to minimize future tax liability for the client 200, and may also prepare all federal, state, and local tax filings. An operations team 224 may handle all bill payment, accounting, and records functions, and may also manage certain entities, such as foundations or other organizations, that are created on the behalf of the client 200. A general counsel team 225 may provide legal advice of a general nature, and may also have affiliations with, and assign tasks to, certain specialty law firms 233.

A second group may be an affiliated network of service providers 230. This grouping may include a risk management service 231, responsible for providing a broad range of high quality insurance products at competitive prices. It also may include certain banking services 232 needed, for example, to provide loans and manage cash. This same category may further contain certain specialty law firms 233 for areas of law that cannot be adequately addressed by the general counsel team 225. Other candidate services include custody of documents 234 and financial reporting 235.

Finally, there may be a category of non-affiliated service providers 240 comprising services such as: automobile leasing or purchasing 241; whole or fractional aircraft ownership 242; whole or fractional yacht ownership 243; real estate services 244; physical security 245 such as home perimeter security and personal body guards; and personal concierge services 246.

Germane to the invention disclosed herein is how these groups are optimally engaged and integrated to efficiently provide a set of comprehensive services to a high-net-worth individual.

Figure 3:
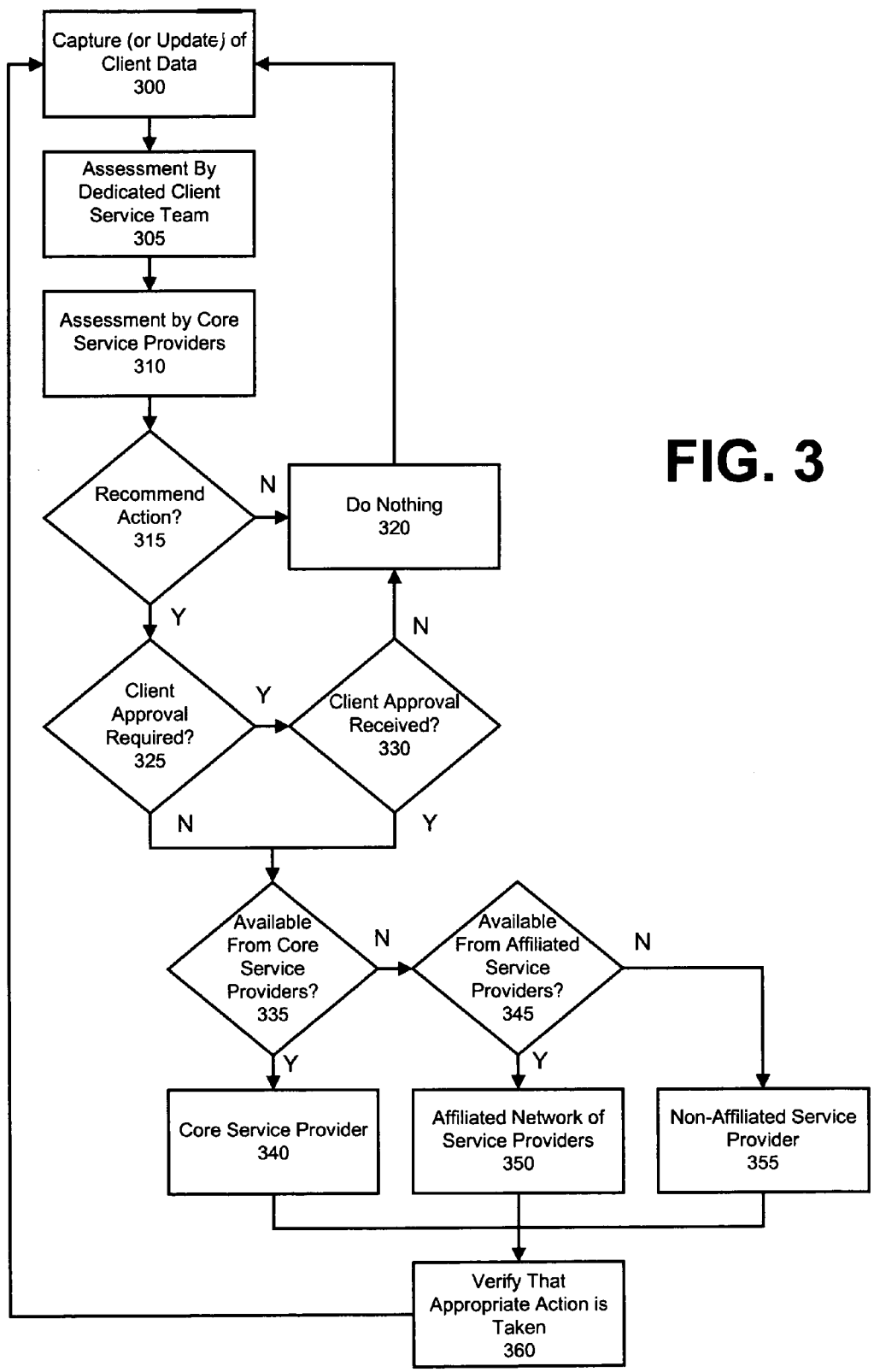
FIG. 3 is a process flow diagram from the perspective of the financial service team.

FIG. 3 is a flow diagram from the perspective of the financial service team. The process begins with the capture (or update) of client data 300. The data in this step may include, for example, a summary of the client's long-term objectives, short-term goals, tolerance for risk, level of participation desired in the management of his or her portfolio, and details of their existing portfolio. The organization responsible for initial capture of the data is the dedicated client services team 210.

In step 305, the dedicated client services team 210 will make an assessment of the strengths and weakness of the current portfolio, and will identify and prioritize aspects requiring additional analysis. Additional analysis may be performed in step 310 by one or more teams within the core service provider group 220. The suggestions of individual teams, for example the asset allocation team 221 and the tax team 223, will be considered by the dedicated client service team 210. That team will thus form a consensus as to whether some action is appropriate 315.

If no action is recommended, then no further services are provided, 320, and the process begins anew 300. If, on the other hand, the dedicated client services team 210 does recommend some action, then the process continues, subject to client approval, 330, if required or appropriate 325.

Services available from core service providers 220 will be so directed 335. Otherwise, the dedicated client services team 210 will determine in step 345 whether the needed services are available from the affiliated network of service providers 230. The effect of steps 335 and 345, taken together, is that client services will be optimally provided in steps 340, 350, or 355 by a service provider from the most appropriate group. The dedicated client services team 210 will continuously verify that the appropriate action has been, or is being, taken.

Figure 4:
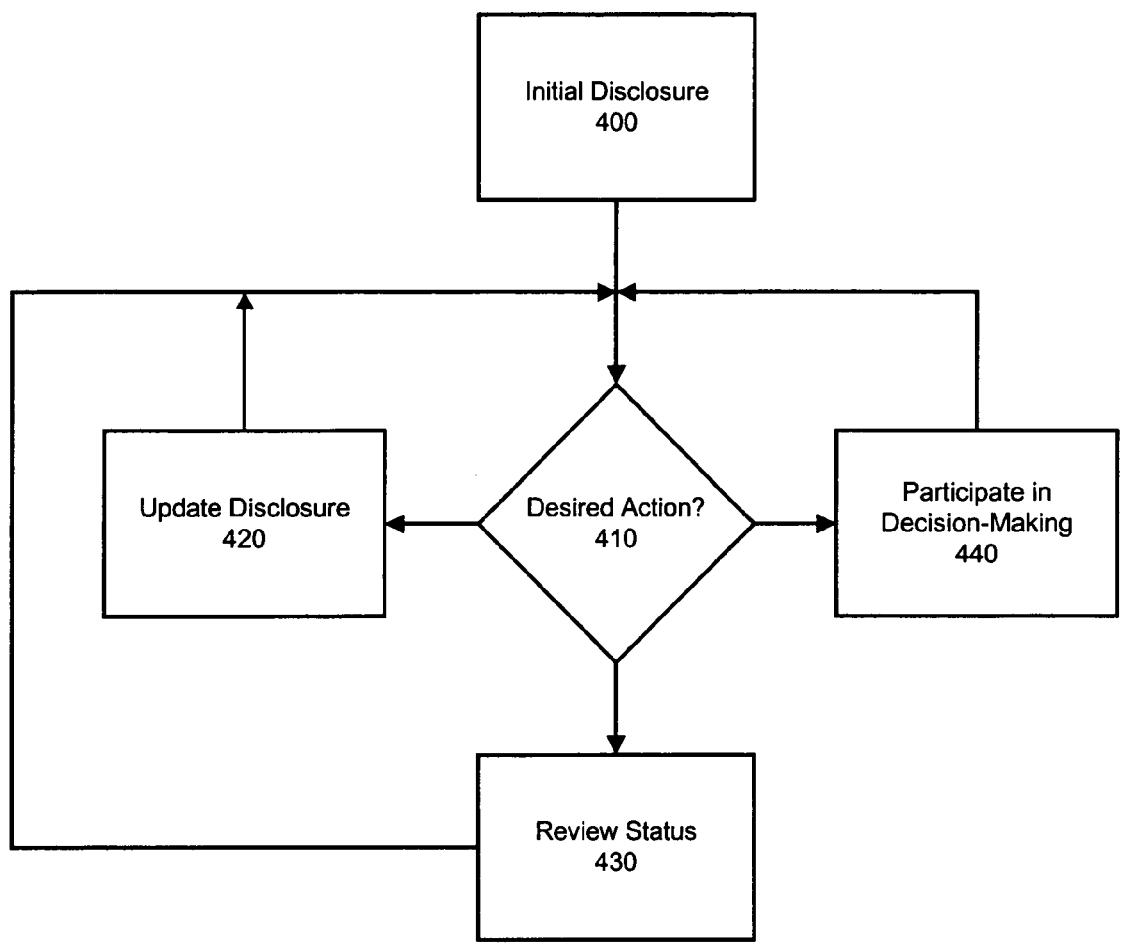
FIG. 4 is a process flow diagram from the perspective of the high-net-worth individual client.

FIG. 4 is a flow diagram from the perspective of the high net worth individual client who makes an initial disclosure of objectives and assets 400, and may choose 410 to update the disclosure 420, review the status of his of her portfolio 430, or participate in decision-making related to services provided on his or her behalf.

Figure 5:
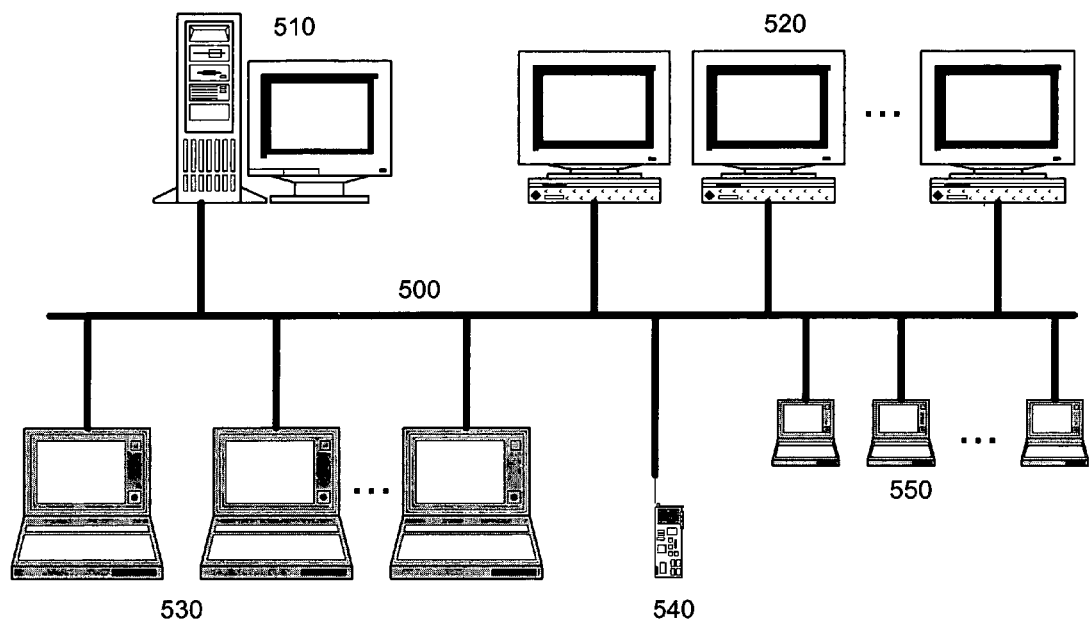
FIG. 5 is a schematic diagram of the system, according to one embodiment of the invention.

FIG. 5 shows an illustrative architecture for the management of client services according to the invention. The server 510 may collect, store, and distribute information related to client accounts and other data, and may be or include, for instance, a workstation running the Microsoft Windows™ N™, Windows™ 2000, Unix, Linux, Xenix, IBM AIX, Hewlett-Packard UX, Novell Netware™, Sun Microsystems Solaris™, OS/2™, BeOS™, Mach, Apache, OpenStep™ or other operating system or platform.

Communications links 500 connect all service providers to each other and to client data and additionally allow the client access to information related to client services, and may be, include or access any one or more of, for instance, the Internet, an intranet, a PAN (Personal Area Network), a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or FDDI (Fiber Distributed Data Interface) or CDDI (Copper Distributed Data Interface) connections. Communications links 500 may furthermore be, include or access any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications links 500 may yet further be, include or access any one or more of an RS-232 serial connection, an IEEE-1394 (Firewire) connection, an IrDA (infrared) port, a SCSI (Small Computer Serial Interface) connection, a USB (Universal Serial Bus) connection or other wired or wireless, digital or analog interface or connection.

Clients 520, 530, 540, and 550 may be or include, for instance, a personal computer running the Microsoft Windows™ 95, 98, Millenium™, NT™, or 2000, Windows™CE™, PalmOS™, Unix, Linux, Solaris™, OS/2™, BeOS™, MacOS™ or other operating system or platform. Clients 520, 530, 540, and 550 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control. Clients 520, 530, 540, and 550 may furthermore include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art. Clients 520, 530, 540, and 550 may also be a network-enabled appliance such as a WebTV™ unit, radio-enabled Palm™ Pilot or similar unit, a set-top box, a game-playing console such as Sony Playstation™ or Sega Dreamcas™, a browser-equipped cellular telephone, or other TCP/IP client or other device.

Network enabled code on clients 520, 530, 540, and 550 may be, include or access, for example, Hyper text Markup Language (HTML), Dynamic HTML, Extensible Markup Language (XML), Synchronized Multimedia Integration Language (SMIL), Java™, Jini™, C, C++, Perl, UNIX Shell, Visual Basic or Visual Basic Script, Virtual Reality Markup Language (VRML) or other compilers, assemblers, interpreters or other computer languages or platforms.

Storage of financial and other data may be embodied, for example, using the Oracle™ relational database sold commercially by Oracle Corp. may be used. Other databases, such as Informix™, DB2 or other data storage or query formats or platforms such as SQL, Microsoft Access or others may also be used, incorporated or accessed in the invention.

The specification and examples provided above should be considered exemplary only. It is contemplated that the appended claims will cover any other such embodiments or modifications as fall within the true scope of the invention.

What is claimed is:

1. A computer implemented method for providing personalized financial services to a client, the computer implemented method comprising the steps of:
    (a) receiving client data from the client comprising at least one client goal and a client portfolio at a depository;
    (b) assessing the client portfolio based at least in part on the client goal;
    (c) assigning a plurality of services to a plurality of service provider groups, further comprising the steps of:
        (i) determining whether each service is needed by the client on a frequent basis;
        (ii) determining whether a level of value to the client is above a predetermined level; and
        (iii) categorizing the plurality of services into a core service provider group, an affiliated service provider group and a non-affiliated service provider group, wherein the step of categorizing is based at least in part on the steps of determining wherein the steps of assessing and assigning are performed at a server; and
    (d) providing services in a hierarchical manner from the core service provider group, the affiliated service provider group and the non-affiliated service provider group in response to the received client data through a display.

2. The method of claim 1, wherein the core service provider group represents services needed by the client on a frequent basis or having a level of value above the predetermined level indicating a primary level of service.

3. The method of claim 2, wherein the non-affiliated service provider group represents services needed by the client on an infrequent basis or having a level of value below the predetermined level indicating a secondary level of service.

4. The method of claim 3, wherein the affiliated service provider group represents services that do not fall within the core service provider group and the non-affiliated service provider group indicating an intermediary level of service.

5. The method of claim 1, wherein the core service provider group represents services most common to the client or providing most value to the client.

6. The method of claim 1, wherein the nonaffiliated service provider group represents services least common to the client or providing a small value to the client.

7. The method of claim 1, wherein services from the core service provider group are presented to the client; wherein services from the affiliated service provider group and services from the non-affiliated service provider group are presented after the services from the core service provider group are first presented.

8. The method of claim 1, wherein the services comprise a plurality of asset allocation services; investment management services; investment banking services; banking services; custody services; reporting services; tax advice services; filing of federal, state and local tax statement services; estate planning services; legal services; accounting services; bookkeeping services; record keeping services; financial investment services; managing financial assets services; management and other services related to closely held stock services; international trusts services; real estate service; public relations services; crisis management services; selection and delivery of insurance services; physical security services; personal security services; information security services; lease, purchase or fractional ownership of automobiles, planes, vehicles or yachts services; personal concierge services; bill paying services; coordination and direction of charitable activities services; background checks on personal staff or other parties services; offering of investment opportunities not available to non-clients services; development and execution of debt reduction strategies services; development and maintenance of education funds services; advice and care of minors, invalids, elderly, incompetents or other persons services; business succession planning services; issuance of loans, traveler's checks, foreign currency, credit or other banking services.

9. A system for providing personalized financial services to a client, the system comprising:
    a depository for receiving client data from the client comprising at least one client goal and a client portfolio;
    a server for assessing the client portfolio based at least in part on the client goal and assigning a plurality of services to a plurality of service provider groups, wherein whether each service is needed by the client on a frequent basis is determined and whether a level of value to the client is above a predetermined level is determined; wherein the plurality of services are categorized into a core service provider group, an affiliated service provider group and a non-affiliated service provider group based at least in part on the steps of determining; and a display for providing services in a hierarchical manner from the core service provider group, the affiliated service provider group and the non-affiliated service provider group in response to the received client data.

10. The system of claim 9, wherein the core service provider group represents services needed by the client on a frequent basis or having a level of value above the predetermined level indicating a primary level of service.

11. The system of claim 10, wherein the non-affiliated service provider group represents services needed by the client on an infrequent basis or having a level of value below the predetermined level indicating a secondary level of service.

12. The system of claim 11, wherein the affiliated service provider group represents services that do not fall within the core service provider group and the non-affiliated service provider group indicating an intermediary level of service.

13. The system of claim 9, wherein the core service provider group represents services most common to the client or providing most value to the client.

14. The system of claim 9, wherein the nonaffiliated service provider group represents services least common to the client or providing a small value to the client.

15. The system of claim 9, wherein services from the core service provider group are presented to the client; wherein services from the affiliated service provider group and services from the non-affiliated service provider group are presented after the services from the core service provider group are first presented.

16. The system of claim 9, wherein the services comprise a plurality of asset allocation services; investment management services; investment banking services; banking services; custody services; reporting services; tax advice services; filing of federal, state and local tax statement services; estate planning services; legal services; accounting services; bookkeeping services; record keeping services; financial investment services; managing financial assets services; management and other services related to closely held stock services; international trusts services; real estate service; public relations services; crisis management services; selection and delivery of insurance services; physical security services; personal security services; information security services; lease, purchase or fractional ownership of automobiles, planes, vehicles or yachts services; personal concierge services; bill paying services; coordination and direction of charitable activities services; background checks on personal staff or other parties services; offering of investment opportunities not available to non-clients services; development and execution of debt reduction strategies services; development and maintenance of education funds services; advice and care of minors, invalids, elderly, incompetents or other persons services; business succession planning services; issuance of loans, traveler's checks, foreign currency, credit or other banking services.

17. The system of claim 9, further comprising one or more of a tool for mining data and a synthetic logic tool for assessing the client portfolio.

18. The system of claim 17, wherein the synthetic logic tool converts data into useful information related to the at least one client goal.

* * * * *